US010759127B2

(12) United States Patent
Thuo et al.

(10) Patent No.: US 10,759,127 B2
(45) Date of Patent: Sep. 1, 2020

(54) SELF-STRENGTHENING POLYMER COMPOSITES

(71) Applicant: Iowa State University Research Foundation, Inc., Ames, IA (US)

(72) Inventors: Martin Thuo, Ames, IA (US); Boyce S. Chang, Ames, IA (US)

(73) Assignee: Iowa State University Research Foundation, Inc., Ames, IA (US)

(*) Notice: Subject to any disclaimer, the term of this patent is extended or adjusted under 35 U.S.C. 154(b) by 140 days.

(21) Appl. No.: 15/932,512

(22) Filed: Mar. 8, 2018

(65) Prior Publication Data

US 2018/0257322 A1 Sep. 13, 2018

Related U.S. Application Data

(60) Provisional application No. 62/600,979, filed on Mar. 8, 2017.

(51) Int. Cl.
| | |
|---|---|
| B29C 73/22 | (2006.01) |
| C23C 22/00 | (2006.01) |
| C09K 5/06 | (2006.01) |
| C08J 3/12 | (2006.01) |
| C08J 3/09 | (2006.01) |
| C08K 3/08 | (2006.01) |
| C08L 83/04 | (2006.01) |
| C08L 9/00 | (2006.01) |

(52) U.S. Cl.
CPC .............. *B29C 73/22* (2013.01); *C08J 3/095* (2013.01); *C08J 3/12* (2013.01); *C08K 3/08* (2013.01); *C08L 83/04* (2013.01); *C09K 5/06* (2013.01); *C23C 22/00* (2013.01); *C08F 2500/21* (2013.01); *C08J 2300/26* (2013.01); *C08J 2383/04* (2013.01); *C08L 9/00* (2013.01); *C08L 2207/53* (2013.01)

(58) Field of Classification Search
CPC .... B29C 73/22; C08J 3/095; C08J 3/12; C08J 2300/26; C08J 2383/04; C08K 3/08; C08L 83/04; C08L 2207/53; C08L 9/00; C09K 5/06; C23C 22/00; C08F 2500/21

See application file for complete search history.

(56) References Cited

U.S. PATENT DOCUMENTS

| 10,266,925 B2 * | 4/2019 | Thuo .................. B22F 1/02 |
| 2018/0258235 A1 | 9/2018 | Thuo et al. |

OTHER PUBLICATIONS

Bartlett, M. D., et al., "Stretchable, High-κ Dielectric Elastomers through Liquid-Metal Inclusions", *Adv. Mater.*, 28(19), (2016), 3726-3731.

Benson, J., et al., "Multifunctional CNT-Polymer Composites for Ultra-Tough Structural Supercapacitors and Desalination Devices", *Adv. Mater.*, 25(45), (2013), 6625-6632.

Byrne, M. T., et al., "Recent Advances in Research on Carbon Nanotube—Polymer Composites", *Adv. Mater.*, 22(15), (2010), 1672-1688.

Çinar, S., et al., "Mechanical Fracturing of Core-Shell Undercooled Metal Particles for Heat-Free Soldering", *Sci. Rep.*, 6: 21864, (2016), 1-12.

Di, J., et al., "Carbon-Nanotube Fibers for Wearable Devices and Smart Textiles", *Adv. Mater.*, 28(47), (2016), 10529-10538.

Diani, J., et al., "A Review on the Mullins Effect", *Eur. Polym. J.*, 45, (2009), 601-612.

Ge, D., et al., "A Robust Smart Window: Reversibly Switching from High Transparency to Angle-Independent Structural Color Display", *Adv. Mater.*, 27(15), (2015), 2489-2495.

Hribar, K. C., et al., "Light-Induced Temperature Transitions in Biodegradable Polymer and Nanorod Composites", *Small*, 5(16), (2009), 1830-1834.

Hwang, W., et al., "Fatigue of Composites—Fatigue Modulus Concept and Life Prediction", *Journal of Composite Materials*, 20, (Mar. 1986), 154-165.

Ilievski, F., et al., "Soft Robotics for Chemists", *Angew. Chem. Int. Ed.*, 50(8), (2011).

Jeon, J., et al., "Flexible Wireless Temperature Sensors Based on Ni Microparticle-Filled Binary Polymer Composites", *Adv. Mater.*, 25(6), (2013), 850-855.

Jeong, S. H., et al., "Mechanically Stretchable and Electrically Insulating Thermal Elastomer Composite by Liquid Alloy Droplet Embedment", *Sci. Rep.*, 5: 18257, (2015), 1-10.

Mullins, L., "Efect of Stretching on the Properties of Rubber", *Rubber Chemistry and Technology*, 21(2), (1948), 281-300.

Nguyen, V, Q., et al., "Morphing Soft Magnetic Composites", *Adv. Mater.*, 24(30), (2012), 4041-4054.

Rus, D., et al., "Design, fabrication and control of soft robots", *Nature*, 521(7553), (2015), 467-475.

Shepherd, R, F., et al., "Multigait soft robot", *Proc. Natl. Acad. Sci.*, 108(51), (2011), 20400-20403.

Sun, T., et al., "Biomimetic Smart Interface Materials for Biological Applications", *Adv. Mater.*, 23(12), (2011), H57-H77.

Tevis, I. D, et al., "Synthesis of Liquid Core-Shell Particles and Solid Patchy Multicomponent Particles by Shearing Liquids Into Complex Particles (SLICE)", *Langmuir*, 30, (2014), 14308-14313.

Tonazzini, A., et al., "Variable Stiffness Fiber with Self-Healing Capability", *Adv. Mater.*, 28(46), (2016), 10142-10148.

Van Meerbeek, I. M., et al., "Morphing Metal and Elastomer Bicontinuous Foams for Reversible Stiffness, Shape Memory, and Self-Healing Soft Machines", *Adv. Mater.*, 28, (2016), 2801-2806.

(Continued)

*Primary Examiner* — Irina S Zemel (74) *Attorney, Agent, or Firm* — Schwegman Lundberg & Woessner, P.A.

(57) ABSTRACT

A composite material is provided including a polymer matrix and undercooled liquid metallic core-shell particles disposed in the matrix, wherein the particles each have an outer shell and a liquid metallic material as a core contained within the outer shell. The outer shell is frangible such that the liquid metallic material is released from at least some of the particles in response to a mechanical load applied to the composite and solidifies in-situ in the polymer matrix. As a result, the composite material can be self-strengthening and self-healing and can be reconfigurable in shape at ambient temperature.

25 Claims, 9 Drawing Sheets

(56) References Cited

OTHER PUBLICATIONS

Wang, M., et al., "Field-responsive superparamagnetic composite nanofibers by electrospinning", *Polymer*, 45(16), (2004), 5505-5514.
Wang, W., et al., "Deployable Soft Composite Structures", *Sci. Rep.*, 6: 20869, (2016), 1-10.
White, S. R., et al., "Autonomic healing of polymer composites", *Nature*, 409, (2001), 794-797.
Yao, S., et al., "Nanomaterial-Enabled Stretchable Conductors: Strategies, Materials and Devices", *Adv. Mater.*, 27(9), (2015), 1480-1511.
Zhang, Q., "Smart three-dimensional lightweight structure triggered from a thin composite sheet via 3D printing technique", *Sci. Rep.*, 6: 22431, (2016), 1-8.
"U.S. Appl. No. 15/932,506, Non Final Office Action dated Jan. 22, 2020", 8 pgs.

\* cited by examiner

SELF-STRENGTHENING POLYMER COMPOSITES

RELATED APPLICATION

This application claims benefit and priority of provisional application Ser. No. 62/600,979 filed Mar. 8, 2017, the entire disclosure and drawings of which are incorporated herein by reference.

FIELD OF THE INVENTION

The invention relates to a composite material comprising a polymer matrix containing undercooled liquid metallic core-shell particles that impart self-strengthening, self-healing, and reconfigurable shaping properties to the composite material.

BACKGROUND OF THE INVENTION

Composite materials have drastically evolved since their first conception, centered on a simple approach of invoking synergy between different materials. The field has since shifted towards creating so called responsive composites, which exhibit tunable properties triggered via an external stimulus. Such materials have been applied as sensors, actuators and platforms for multi-functional devices.[1-9] Mechanically reconfigurable parts are especially desirable in the field of soft robotics, whereby adaptive components are essential for locomotion.[10-12] Several forms of activation have been applied in responsive composites; common examples include temperature, electromagnetic radiation, electric and magnetic field.[13-19] Mechanical stimulus, although scarce could potentially offer important applications such as self-healing, sound engineering and mechanically adaptive materials. White et al. demonstrated autonomic healing capabilities in a polymeric composite by introducing monomer containing microcapsules, which undergoes polymerization upon contact with the catalyst filled matrix. Crack formation in the composite presumably breaks the microcapsules, which allows the monomer to escape into the matrix and concomitantly polymerizes, thus, preventing further propagation by filling the crack.[20] Synthesis of such microcapsules, however, involve time consuming procedures and a variety of reagents. Furthermore, considering that a catalyst must be incorporated into the matrix, the type of polymer applicable to this method might be limited.

Recently, Tevis et al. developed a simple and low cost method known as SLICE for producing undercooled liquid metal core-shell (undercooled LMCS) particles.[21] This method involves shearing liquid metals as an emulsion to produce spherical-like particles wherein separation of the particles is maintained by concomitantly oxidizing the surface of the metal. cinar et al. applied this technique to produce undercooled liquid metal undercooled particles in a metastable state whereby a normally solid metal maintains itself as a liquid below its melting temperature.[22] Interestingly, it was demonstrated that protective oxide is partly elastic, and further deformation will eventually lead to solidification of the undercooled metal. Utilizing this phase transformation phenomena, these investigators showed that such undercooled liquid metal particles can be used as heat-free solders, triggered by mechanical deformation.

SUMMARY OF THE INVENTION

The present invention involves incorporation of metastable, undercooled liquid metallic core-shell particles into a polymer matrix to provide a composite material exhibiting strengthening (stiffening) behavior as a response to a stimulus applied to the composite due to phase change (e.g. solidification). This behavior can be employed to form a reconfigurable composite material, which will also exhibit reversible temperature induced shape memory effect.

An illustrative embodiment involves a composite material comprising a polymer matrix and undercooled liquid metallic core-shell particles disposed in the matrix, wherein the particles each have an outer shell and a liquid metallic material as a core contained within the outer shell. The outer shell is frangible (e.g. breakable) such that the liquid metallic material is released from at least some of the particles in response to an external stimulus applied to the composite and phase-changes in-situ in the polymer matrix. As a result, the composite material can be self-strengthening and/or self-healing and can be reversibly reconfigurable in shape.

These and other advantages and objects of the present invention will become more readily apparent from the following description taken with the following drawings.

DETAILED DESCRIPTION OF EMBODIMENTS OF THE INVENTION

The present invention involves a composite material having a polymer matrix into which metastable, undercooled liquid metallic core-shell particles are incorporated (dispersed) to impart self-strengthening (stiffening) and self-healing behavior as a response to an external stimulus due to solidification. The composite material can be reconfigurable in shape and can exhibit temperature induced shape memory effect. Although the examples below describe illustrative applications of tensile or compressive force as the external stimulus, practice of the present invention is not so limited and envisions using application of other alternative external stimulus to the polymer composite including, but not limited to, at least one of a shear force, vibrational force, a chemical etchant, a chemical flux, heat application, shock wave impingement, ultrasound impingement, and light impingement such as laser light and focused beam light impingement.

The polymer matrix can be selected from any suitable elastomeric or non-elastomeric polymer. Elastomeric polymers can include, but not limited to, silicone rubber and its respective analogs, polybutadiene/polyisoprene and its respective analogs, and other copolymers that exhibit elastomeric properties. Elastomeric polymers are any polymeric materials that exhibit large elastic deformation; that is, the ability to be highly stretched, compressed, deformed etc. (e.g. up to 700% in some cases) and return to their original shape when stress is released. The polymer matrix alternatively can be a non-elastomeric polymer of various types.

The metastable, undercooled (supercooled) liquid metallic core-shell particles can be selected from any suitable metallic material that can be undercooled by the aforementioned SLICE process or other process to a metastable state having a liquid metallic core contained within a protective solid shell near and at room temperature, which typically can be 20 to 27 degrees C. for purposes of illustration. Such metallic materials include, but are not limited to, Field's metal (Bi:In:Sn 32.5:51:16.5 weight %; melting point-about 62° C.), EGaIn (Ga:In 75:24.5 weight %; melting point-15.7° C.), a Bi—Sn alloy (Bi:Sn:58:42 weight %; melting point about 139° C., Rose's metal (Bi:Pb:Sn 50:25:25 weight %; melting point-about 98° C.), and others.

The undercooled LMCS particles preferably are made by the aforementioned SLICE process, which is an extension of droplet emulsion technique (DET), although the particles can be made by other techniques. The SLICE process involves shearing a low $T_m$ (melting point) molten metal or alloy in the presence of a carrier fluid together with chemical reaction to produce liquid metallic core-shell nano-particles or micro-particles. The chemical reaction typically involves oxidation of the molten metal or alloy droplets in a manner to form an outer oxide shell in-situ on the liquid metallic core. Moreover, the outer shell can be functionalized with an organic moiety, such as an acetate ligand or phosphate.

The following examples are offered to illustrate, but not limit, the present invention.

Examples

Undercooled liquid metallic core-shell (undercooled LMCS) particles of Field's metal (FM) and eutectic galium-indium (EGaIn) were synthesized using the SLICE method described by I. D. Tevis, L. B. Newcomb, M. Thuo, Langmuir 2014, 30, 14308, the disclosure of which is incorporated herein by reference to this end.

In particular, the undercooled FM LMCS particles were made by shearing Field's metal in air in acetic acid-diethylene glycol solution. In a typical synthesis, 1 gram of Field's metal is placed into a vial containing 5 ml of 5% v/v acid solution. The vial was then heated using an oil bath (heating tape can also be used) to about 160° C. A Teflon head attached to the rotary tool was used to shear the mixture as described by I. D. Tevis, L. B. Newcomb, M. Thuo, Langmuir 2014, 30, 14308 incorporated herein above. The shearing was performed for 10-15 minutes and then solution was allowed to cool at room temperature. The particles were then filtered through filter paper and rinsed in ethanol.

The undercooled EGaIn ULMCS particles were made by shearing EGaIn in acetic acid-water solution. In a typical synthesis, 3 grams of EGaIn is placed into a laboratory grade blender containing 100 ml of 5% v/v acid solution. The shearing (blending) was performed for 10-15 minutes. The particles were then filtered through filter paper and rinsed in ethanol.

These undercooled LMCS particles were incorporated into the silicone elastomer matrix (Dow Corning Sylgard® 184) as filler particles to form an elastomeric polymer-LMCS particle composite. The undercooled LMCS particles were incorporated into the silicone elastomer matrix by drying the particles from ethanol, then directly introducing them into the pre-cured silicone elastomer. The mixture is then stirred very gently for several minutes until a homogeneous blend is formed. Finally, the mixture is outgassed to removed trapped bubbles and cured at 80° C.

All mechanical tests were performed via dynamic mechanical analysis (DMA) (TA Instruments Q800) on thin film samples of the illustrative composite materials.

Figure 1:
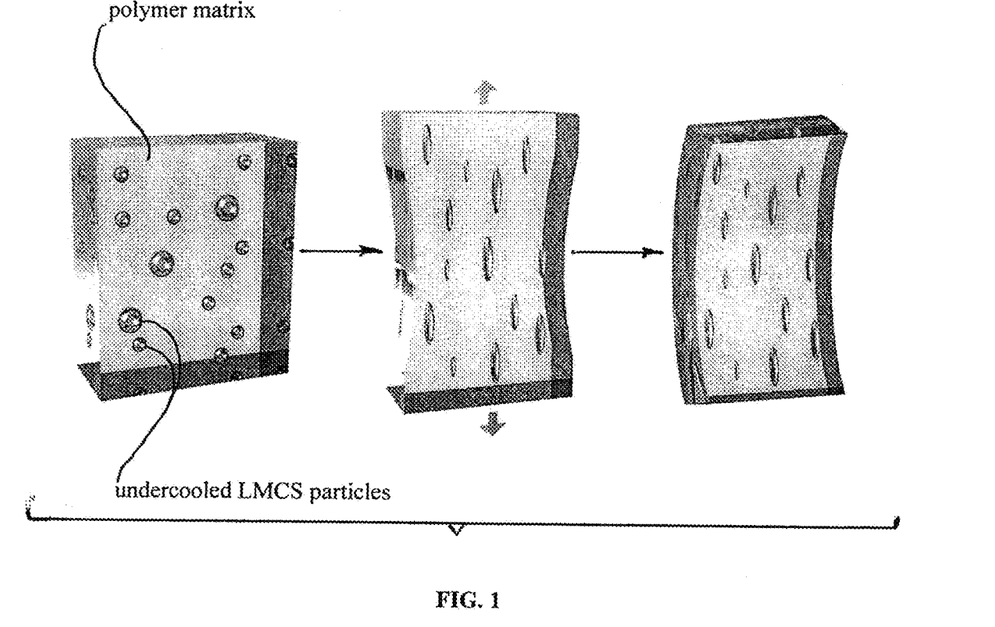
FIG. 1 is a schematic view showing deformation of a composite material pursuant to an embodiment of the invention leading to rupture and solidification of the released undercooled liquid metallic core of the particles in the polymer matrix.
Figures 2A, 2B:
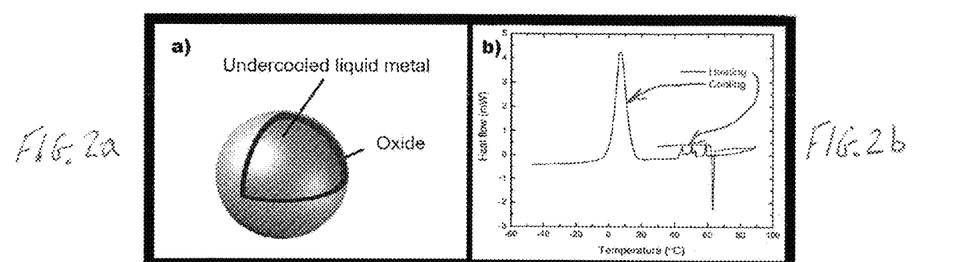
FIG. 2a is a schematic of an undercooled liquid metal core-shell (undercooled LMCS) particle.
FIG. 2b shows differential scanning calorimetry of undercooled FM LMCS particles.
Figure 2C:
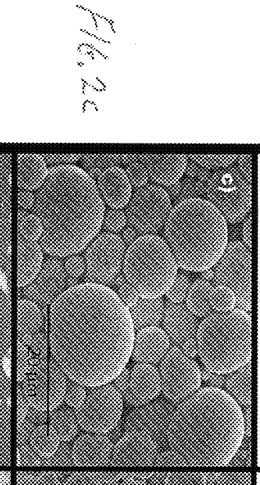
FIGS. 2c-2d show secondary electron images of undercooled Field's metal LMCS particles and their solidification upon deformation where FM is Field's metal.
Figure 2D:
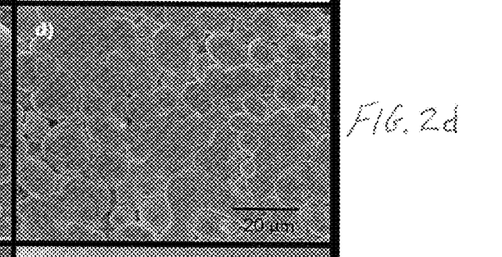

The liquid core nature of the synthesized undercooled LMCS particles (see FIG. 2a) and their survival upon incorporation into the elastomeric matrix were evaluated by thermal analysis and imaging. Differential scanning calorimetry (DSC) (FIG. 2b) of the undercooled FM LMCS particles clearly depicts the underlooled nature, considering that the event of freezing is mostly (90%) centered at 7° C. ($T_{melt}$=62° C.). Tiny freezing peaks observed between 40-60° C. correspond to solidified particles, in agreement with the melting peak from the heating curve. FIGS. 2c-2d show the FM ULMCS particles before and after sweeping with a spatula at room temperature. The particles appears to fuse with each other, suggesting that they were initially liquid and upon deformation, flow before undergoing solidification.

Figure 2E:
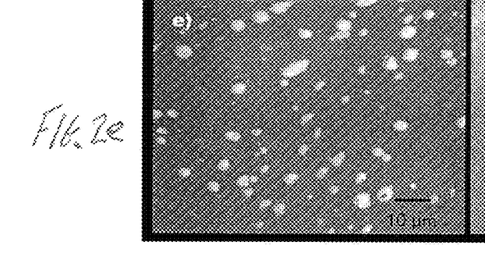
FIGS. 2e-2f are backscattered electron images of a cross-section of a FM LMCS particle-silicone matrix composite.
Figure 2F:
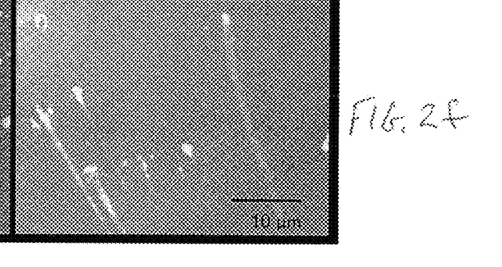

FIGS. 2e-2f illustrate a cross-section of the undercooled FM LMCS particle-silicone matrix composite. The observation of flow lines (FIG. 2o indicates the survival of at least some of the undercooled LMCS particles during fabrication, although not all of the incorporated particles may remain undercooled due to their metastable nature.

Figure 3A:
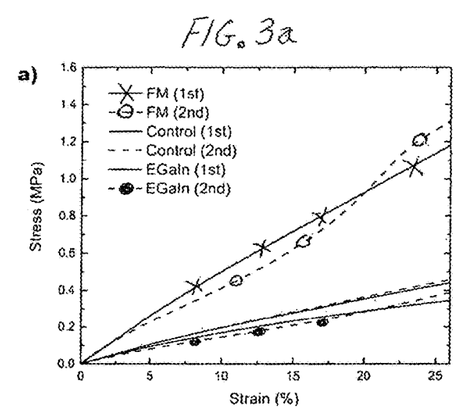
FIG. 3a shows tensile testing results at room temperature of the undercooled FM LMCS particle-silicone matrix composite and the undercooled EGaIn LMCS particle-silicone matrix composite (both 22% by volume filler). The dotted line represents the $2^{nd}$ loading on the same sample.

Repeated tensile strain at room temperature were performed on undercooled LMCS particle-polymer composites using 1) FM (Field's metal), which undergoes solidification upon particle breakage and 2) EGaIn, a liquid metal under standard room temperature conditions. Despite repeated strain, the pristine silicon elastomer (Control sample) and EGaIn LMCS particle-silicone matrix composite showed negligible change in stiffness (see FIG. 3a). The FM LMCS particle-silicone matrix composite on the other hand experienced an undulation around its initial stress-strain curve due to Mullin's effect.[23, 24] This effect is described as a strain softening phenomena observed in elastomeric composites, often attributed to bond rupture (between filler and matrix), molecular slip (matrix), and filler rupture among others.[25] The stiffness of the FM LMCS particle-silicone matrix composite finally rises above its initial stiffness, suggesting that the material had undergone strain hardening upon repeated loading. Hence, dynamic loading testing was performed in order to capture the change in stiffness of the composite. Dynamic tensile strain was applied onto the fabricated composite at 1 Hz, with increasing amplitudes from 500-1600 µm (within the elastic region of the sample).

Figure 3B:
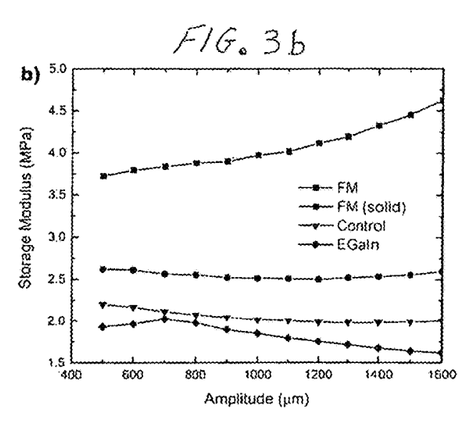
FIG. 3b shows dynamic strain with increasing amplitude (15 volume % FM particles and 22 volume % EGaIn particles).

The undercooled FM LMCS particle-silicone matrix composite showed gradual increments in storage modulus (FIG. 3b), supporting the observation of a strain hardening material. The rise in modulus appears to be a result of solidification of the undercooled liquid metal, induced by deformation of the composite. The storage modulus of the undercooled EGaIn LMCS particle-silicone matrix composite displays a minute step increase in modulus also at 700-800 µm, however, gradually decreases from 500-1600 µm (FIG. 3b). This observation can be attributed to oxide (shell), which induced a slight step increase in modulus and after that steady decline due to the exposed liquid metal core. For the control (pristine) silicone elastomer, as expected a relatively constant storage modulus was observed with only partial decline at lower amplitudes (FIG. 3b). Finally, loading a composite using solidified Field's metal particles (FM solid line) with equal volume percent showed a similar behavior with the Control sample, validating that the change in stiffness in the FM LMCS particle-silicone matrix sample was induced by the solidification of the undercooled particles.

Figure 3C:
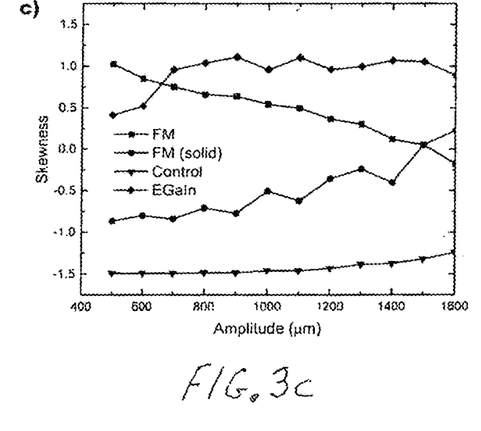
FIG. 3c shows the change in skewness of the storage modulus distribution.

The difference in behavior of the composites evaluated could also be highlighted by tracking the change in skewness with increasing amplitude (FIG. 3c). The EGaIn LMCS particle-silicone matrix composite showed a steep rise in skewness at lower amplitudes and plateaued towards the end, indicating the sample population shifting towards lower modulus. The Control sample and FM solid particle sample again showed similar behavior with each other. Both exhibited gradual increase in skewness (FIG. 3c) and only differ in terms of magnitude. Convincingly, the FM LMCS particle-silicone matrix composite showed a decrease in skewness (FIG. 3c), shifting from positive to negative indicating that the sample population at low amplitude is biased towards low storage modulus; however, with increasing amplitude, inverts its inclination towards high storage modulus. The distribution of storage modulus as function of amplitude was plotted in the form of heat maps, which illustrate the change in sample population suggested by the skewness plots. The standard deviation of FM LMCS particle-silicone matrix composite appears to increase at higher amplitude, whereas the EGaIn LMCS particle-silicone matrix composite decreases. This is likely due to differences in number of particles that remains undercooled in the FM LMCS particle-silicone matrix composite. In the case of EGaIn as the particle filler core material, all particles remain liquid through the mechanical test and thus, their properties converge.

Figure 4A:
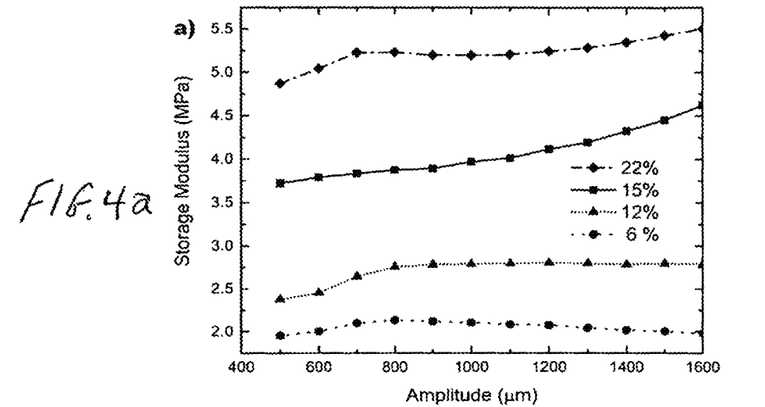
FIG. 4a shows storage modulus versus amplitude of the undercooled FM LMCS particle-silicone matrix composite of various compositions (various filler particle volume percents) at room temperature.

The stiffness of undercooled FM LMCS particle-silicone matrix composite increases at higher particle volume percent (FIG. 4a). At $\phi$=6%, the storage modulus rises moderately at low amplitudes and depresses steadily later on, similar to the Control sample and the EGaIn LMCS particle-silicone matrix composite, indicating that its mechanical properties are matrix dominated. At the other end of the spectrum, the storage modulus of the FM LMSC particle-silicone matrix composite sample with $\phi$=22% quickly rises at the beginning and plateaus until 1200 µm before continuing to rise. This may be due to the introduction of defects such as stress concentration areas as more filler were integrated, which would induce the formation of cracks throughout the composite, although the inventors do not wish or intend to be bound by any explanation in this regard. Hence, during the plateau region, a competition appears to occur between hardening due to particle solidification and what appears to be 'softening', caused by fatigue in the material via crack propagation or formation. Higher filler amounts could lead to greater inhomogeneity of the composite, creating more of such defects.

Figure 4B:
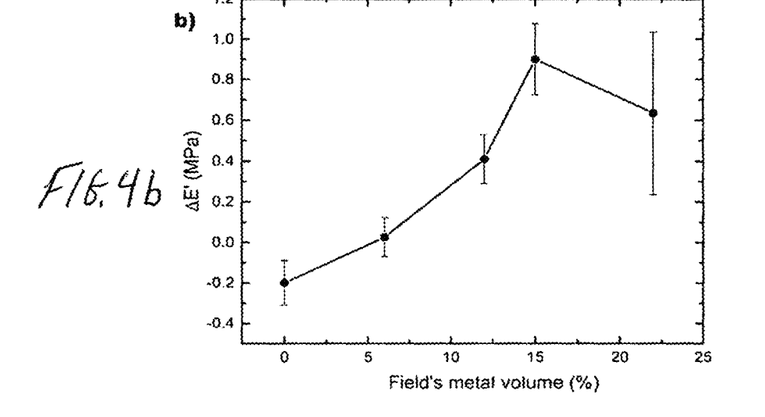
FIG. 4b shows total change in stiffness, $\Delta E'$ at each composition.
Figure 4C:
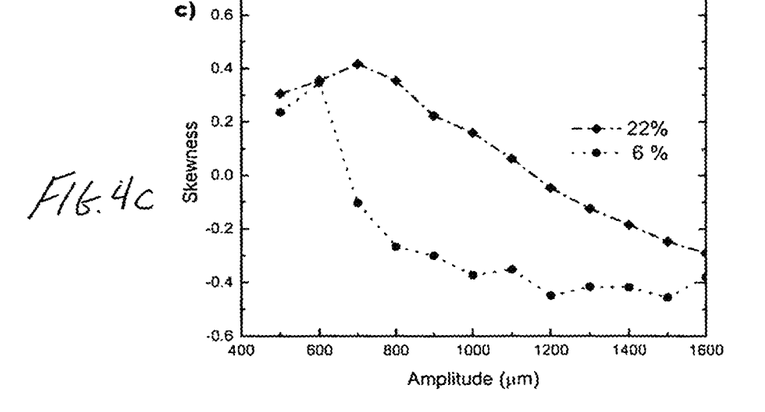
FIG. 4c shows change in skewness of the storage modulus distribution.

Evaluating the total change in stiffness, $\Delta E'$, in the range of amplitude surveyed (FIG. 4b) supports the observed stiffness increase. A steady rise in $\Delta E'$ was observed up to composite $\phi$=15%; however, the trend is discontinued at composite $\phi$=22% and this is followed by a wide spread in the data. Considering that stress concentration sites generated by the particles are directly linked to their spatial distribution in the composite, large variances can develop between samples when higher filler volume is used. The change in skewness (FIG. 4c) as expected shifted from positive to negative, once again validating the change in stiffness of the composite due to phase transformation of the undercooled FM LMCS particles of the composite.

Figure 5A:
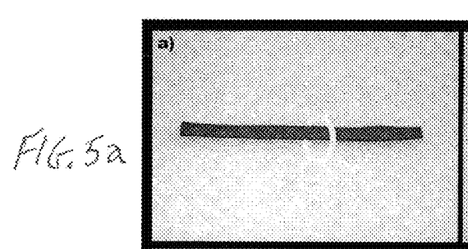
FIGS. 5a and 5b show twisting deformation mode of the self-strengthening the undercooled FM LMCS particle-silicone matrix composite at room temperature.
Figure 5B:
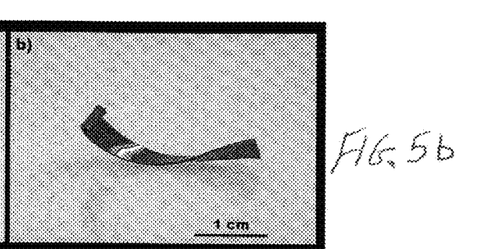
Figure 5C:
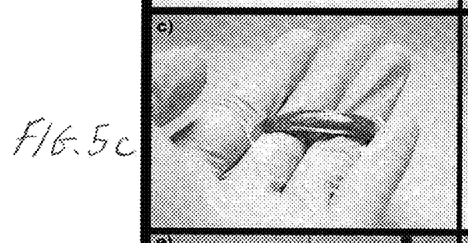
FIGS. 5c and 5d show folding deformation mode of the self-strengthening undercooled FM LMCS particle-silicone matrix composite.
Figure 5D:
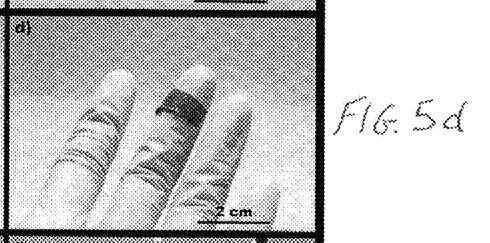
Figure 5E:
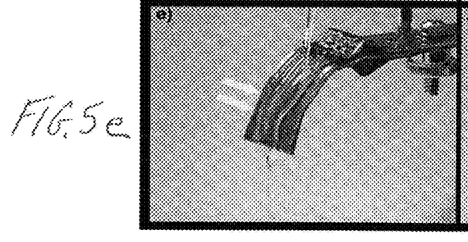
FIGS. 5e and 5f show an embossing deformation mode of the self-strengthening undercooled FM LMCS particle-silicone matrix composite.
Figure 5F:
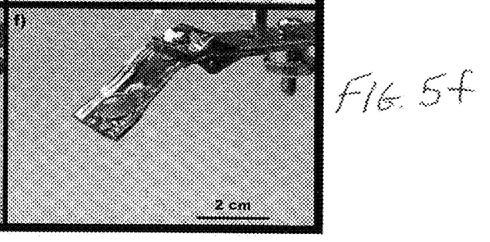

Self-strengthening behavior displayed by the undercooled FM LMCS particle-silicone matrix composites could potentially function as a reconfigurable composite. FIGS. 5a-5f show the different modes of deformation that can be applied to the self-strengthening composite, which results in permanent distortion. FIGS. 5a-5b illustrate that the shape of the ST3R composite is tunable or reconfigurable at room temperature, in this case by twisting a sample.

Elastomeric composites, which self-strengthen and compile with an induced load might find emergency field applications that could benefit from having adaptive materials. For example in FIGS. 5c-5d, simply by folding the FM LMCS particle-silicone matrix composite at several points along the long axis, a relatively flat material now grips onto one's finger. Similarly, FIGS. 5e-5f demonstrate the collection of water droplets by reshaping an otherwise ineffective material without the need of any other stimuli.

Figure 6A:
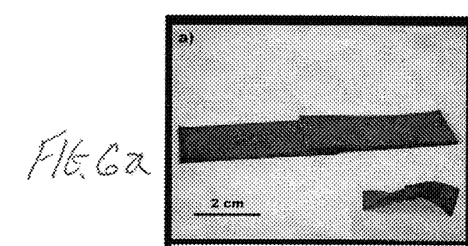
FIGS. 6a-6b show a single lap joint using undercooled FM LMCS particle-silicone matrix composite samples.
Figure 6B:
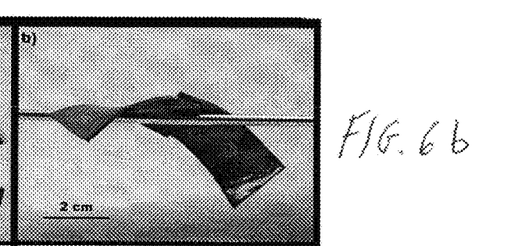
Figure 6C:
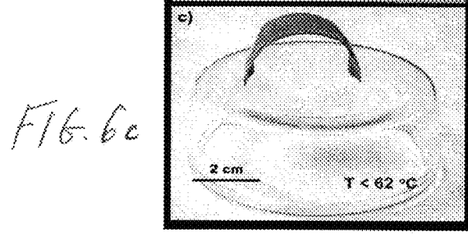
FIGS. 6c-6d show shape memory of the composite sample by thermal actuation.
Figure 6D:
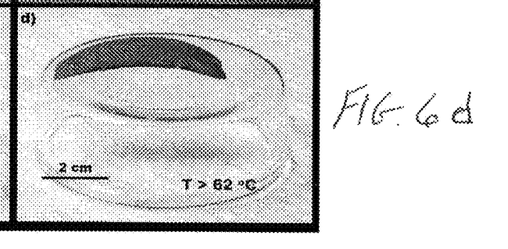

FIGS. 6a-6b demonstrate two separate FM LMCS particle-silicone matrix composites connected by a single lap joint, whereby each side can be deformed individually. Furthermore, the deformed composite is capable of lifting itself when suspended. FIG. 6c-6d display shape memory effect of deformed FM LMCS particle-silicone matrix composite when heated above the melting temperature of the metal, hence, showing direct evidence that reconfiguration is supported by solidified metal.

Further Examples

These examples demonstrate stiffness running through thermodynamics relaxation (abbreviated ST3R hereafter). For example, a ST3R composite is able to support fifty times its own weight after compressive shaping in a mold. Such a large change in stiffness is not observed in the case of the pure polymer matrix or the pure solid metal, and hence is unique to the ST3R composite. The mechanically induced phase transformation of metastable undercooled LMCS particles does not require external heat sources or electrical stimulation, providing an autonomous approach to self-stiffening when the material is subjected to mechanical stress during load-bearing applications.

The experimental details are set forth as follows:

Materials: Eutectic indium (51%)-bismuth (32.5%)-tin (16.5%) (Field's metal) was purchased from Rotometals. Eutectic gallium (75.5%)-indium (24.5%) (EGaIn) was purchased from Sigma Aldrich. Slygard 184 polymer was purchased from Ellsworth Adhesives. Ethanol (>99.2%) was purchased from Decon Laboratories Inc. Glacial acetic acid (99.7%) was purchased from Fisher Scientific. Diethylene glycol (99.9%) was purchased from VWR.

Preparing undercooled liquid metal core-shell (undercooled LMCS) particles: The SLICE (Shearing Liquids Into Complex Particles) method was applied to produce all the particles used in this example. In a typical synthesis, 2.5 grams of Field's metal was placed into a vial containing 5 ml of solvent (diethylene glycol containing 5% acetic acid). The vial was then heated using an oil bath at 145° C. After 5 minutes, a teflon stirrer attached to a Dremel tool is placed into the vial, making sure that contact is made with the molten metal. The solution is stirred with gradual increase from 0-22,000 rpm. The shearing was maintained at this speed for 10 minutes, and the vial is subsequently removed from the oil bath with continuous shearing. Once the vial is completely out of the oil bath, the speed of the Dremel tool is gradually reduced back down to 0 rpm. The resulting grey solution is then filtered and rinsed using ethanol to remove residual solvent. Based on inspection by SEM, particle size ranged from 1-20 µm.

ST3R composite preparation: As a general procedure, undercooled LMCS particles of desired amount were first filtered and dried on filter paper, and then added into premixed Dow Corning Sylgard 184 silicone elastomer polymer (10:1 ratio Base:catalyst ratio) to form the ULMCS particle-elastomer composite (ST3R composite). In a typical preparation, 8 grams of Field's metal undercooled particles are added into 1 gram of Sylgard 184 polymer. The mixture is stirred for at least 10 minutes until a homogeneous mixture is achieved before outgassing. During this process, it is expected that some undercooled particles might be triggered and solidify; however, based on DSC and mechanical data clearly majority are not affected. The same procedure is used for all other fillers. Curing was performed at 100° C. for approximately 12 hours in a glass mold (4.0×4.0×0.1 cm) sprayed with mold release (Mane mold release agent). The composite was subsequently cut into 4×0.5×0.1 cm rectangular strips using a razor. Composites for Dynamic Mechanical Testing were molded in polystyrene weigh boats; thus, these samples were cured at 60° C. These samples were cut into 2.0×0.5×0.1 cm using a razor.

Differential scanning calorimetry (DSC) was performed using TA Instruments Q2000 (Heating/Cooling rate=10° C./min). For example, 3 mg (milligrams) of particles are added into an aluminum pan, and subsequently placed into the DSC stage, which has a temperature of 40° C. by default. The temperature is held constant for 5 minutes to achieve equilibrium before performing cooling/heating.

Scanning electron microscopy (SEM) of the undercooled LMCS particles was obtained using JEOL JSM-6060LV with a secondary electron detector (ET detector) and accelerating voltage of 20 kV. Micrographs of the composite were taken using an FEI Inspect F50 with a backscattered electron detector to obtain contrast between the matrix and fillers. Accelerating voltage was initially set to 8 kV but to further increase Z contrast (to show spinodal decomposition), it was increased to 30 kV.

Mechanical testing: Dynamic mechanical analysis (DMA) measurements in tension mode were performed using TA Instruments Q800. Dynamic strain was set at 1 Hz and static force at 0.01 N with increasing amplitude from 500 µm to 1600 µm. Tension tests were performed on Instron 5944 single column testing system using pneumatic grips and an extension rate of 1 mm/sec. The initial gauge length is maintained at 27 mm for both pristine and pre-compressed samples.

Sample Pre-compression: Samples were pre-compressed for testing by placing the composite sample centered between two acrylic plates (5 cm×10 cm) and then compressed between the acrylic plates using a hydraulic press at the desired compressive load.

Figure 7A:
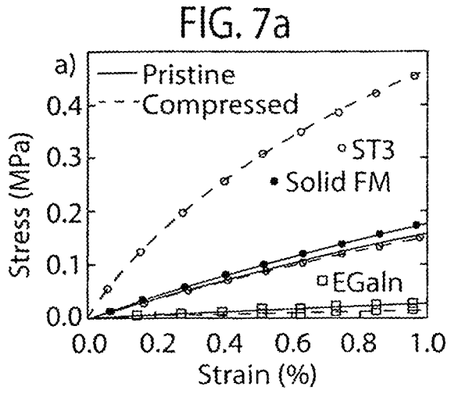
FIG. 7a are stress-strain curves for pristine and pre-compressed $\phi=50\%$ ST3R composites at low strain (1%) where $\phi$ is the undercooled filler particle volume fraction.
Figure 7B:
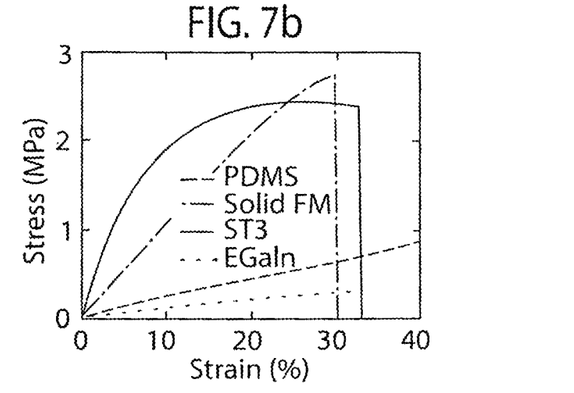
FIG. 7b shows stress-strain curves for pre-compressed φ=50% composites (note for EGaIn sample φ=30% data is presented since the 50% samples fractured upon compression).

Results:

To investigate mechanically triggered phase-change driven stiffness enhancement of the composites, tensile tests were performed on pristine and pre-compressed ST3R samples. In FIGS. 7a and 7b, tensile stress-strain curves are shown for pristine (solid line) and pre-compressed (dashed line) composites at filler volume fraction, $\phi=50\%$, comparing ST3R samples with two similarly prepared control samples of ambient liquid metal (eutectic gallium indium, EGaIn) and solid FM particles of comparable dimensions. The data points of the ST3R samples are denoted ST3 in these figures.

Figure 7C:
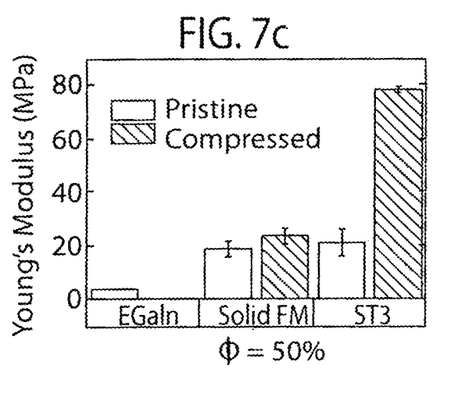
FIG. 7c shows a comparison between Young's modulus (MPa) of pristine and pre-compressed φ=50% composites.

It was observed that the pre-compressed ST3R composite shows a significant increase in initial stiffness (FIG. 7a), while both EGaIn and solid FM particle-containing samples show an insignificant change due to compression. The dramatic increase in stiffness appears to be due to solidification of ULMCS particles; that is, transformation of the initially liquid particles into a solid metal, likely with concomitant formation of an interconnected network due to inter-particle fusion, although the inventors do not wish or intend to be bound by any explanation in this regard. The ST3R composite shows a 300% increase in Young's modulus (about 80 MPa), significant transition from a flexible low modulus as-prepared pristine parent material (FIG. 7c).

In contrast, the EGaIn particle-containing sample fractured upon pre-compression while solid FM particle-containing composites show a statistically insignificant increase in stiffness. To confirm differences in mechanical properties of the compressed samples, the materials were subjected to high stresses, wherein shape change and network formation may differentiate compressed ST3R composite from solid FM particle samples (FIG. 7b). Besides the larger (300%) initial stiffness for ST3R, an asymptotic mechanical response was observed prior to yielding, similar to plastic deformation in metals (FIG. 7b). The stress-strain curve in FIG. 7b supports the presence of some interconnected (fused) filler particles in the matrix, whereby the filler networks break as strain is increased, leading to the flattening of the stress-strain curve at higher strains. The filler networks appear to be formed by the liquid metal alloy that flows between adjacent ruptured filler particles and then solidifies to form the inter-particle networks. The ST3R composite becomes electrically conductive after compression.

Figure 7D:
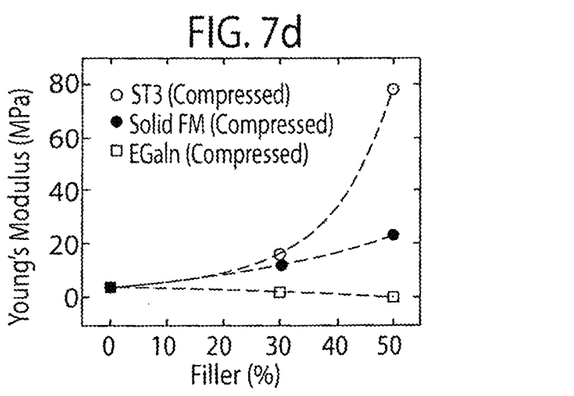
FIG. 7d shows Young's modulus (0.2% strain) of composites after compression with increasing φ.

This phenomenon is further investigated by varying the volume of filler (FIG. 7d). When ϕ=30%, the precompressed ST3R and solid FM particle-containing samples gave comparable modulus (12-15 MPa). At ϕ=50%, however, a dramatic change in modulus is observed in the ST3R sample (FIG. 7d). This is consistent with the formation of filler networks of sold metal alloy between at least some of the filler particles whereby a minimum filler volume is required.

Since solidification is a stochastic (thermodynamic phase transformation) process, the strain-driven changes in the modulus should lead to significant differences between ST3R and analogous composites where no phase change occurs. The change in elasticity should, therefore, manifest as an asymmetry in the distribution of complex stiffness leading to a unique trend in skewness for the ST3R composite under dynamic stress compared to static (nonresponsive) analogous composites (e.g. EGaIn particles, solid FM particles or glycerol droplets). To confirm this, dynamic tensile strain were performed on thin rectangular samples (1.0×0.5×0.1 cm) at 1 Hz, with increasing amplitudes from 5-15% strain. The ST3R composite shows an increase in complex stiffness as strain is increased (FIG. 7e), supporting the indication of a strain hardening material. The rise in complex stiffness may be a result of partial solidification of the undercooled liquid metal, induced by deformation of the composite, although the inventors do not wish or intend to be bound by this explanation.

Figure 7E:
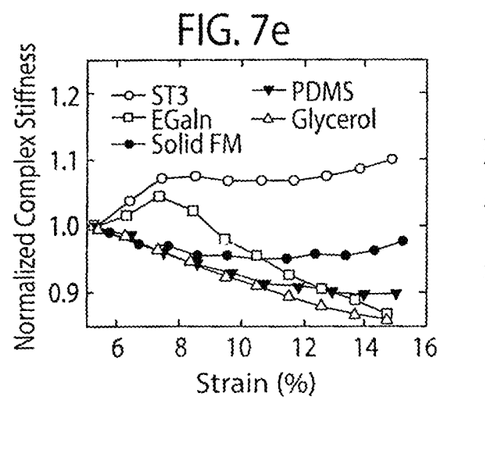
FIG. 7e shows a normalized complex stiffness with increasing cyclic strain for composites with φ=22%.
Figure 7F:
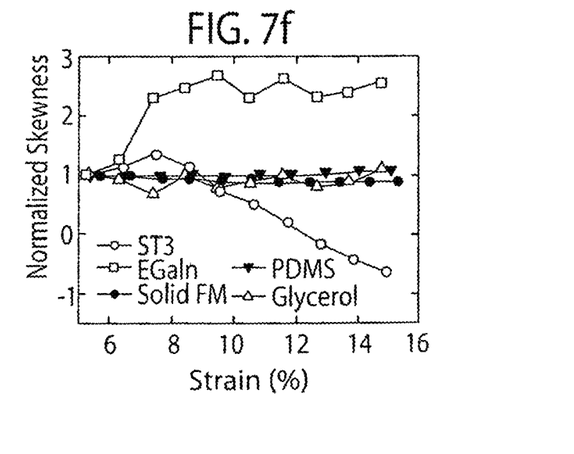
FIG. 7f is a normalized skewness in the distribution of complex stiffness. All tests conducted at room temperature.

In contrast, EGaIn filler particles show a small initial rise in normalized complex stiffness before a decrease as strain is increased. Additional control experiments of solid FM particles, glycerol droplets, and PDMS (matrix) further show a decrease in stiffness as strain is increased, highlighting the unique behavior of the ST3R (FIG. 7e). A shift in skewness of the distribution of complex stiffness (FIG. 7θ was observed, whereby positive values represent bias in the mass of the distribution towards lower stiffness and negative values point towards higher stiffness. It is therefore evident that only the ST3R composite displayed a shift towards higher complex stiffness. Although stiffness is enhanced after mechanical loading, the increase is on the order of 10%. Analysis of the stressed composite samples (DSC) indicates that under these experimental conditions, only 14% of undercooled particles solidified after tensile elongation while total solidification was obtained with the compressed samples. This low conversion correlates with modest increase in stiffness, and highlights that stiffness transformation is limited in tension and will not occur under small perturbations. Thus, special handling of the composite was not required under the above-described experimental conditions.

Figure 8A:
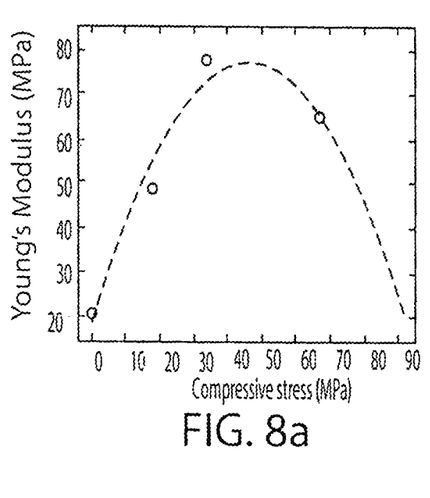
FIG. 8a shows Young's modulus (MPa) as a function of increasing pre-compression stress for φ=50% ST3R samples. The line between data points represents a guide to the eye.

To further explore the effect of pre-compression on metastable particle transformation, a series of experiments on varying pre-compression stress on ϕ=50% ST3R samples was performed. Young's modulus increases with the pre-compressive stress up to 33 MPa (FIG. 8a). Although 68% strain was produced, more than half of the deformation springs back, which results in an approximately 30% permanent deformation. However, further incremental increase in compression to 70 MPa leads to a decrease in Young's modulus, likely due to damage to the matrix as suggested by the transition to higher compressive stiffness due to solid dominated deformation.

Figure 8B:
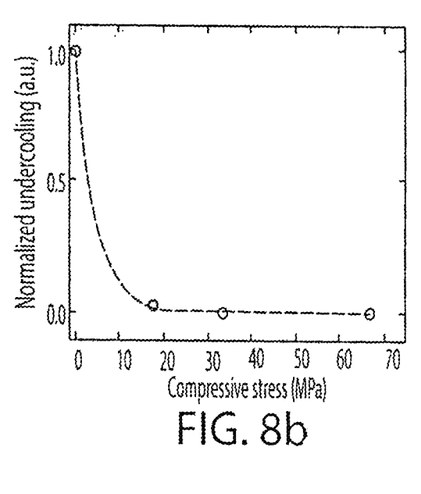
FIG. 8b shows normalized fraction of undercooling for φ=50% ST3R composites.
Figure 8C:
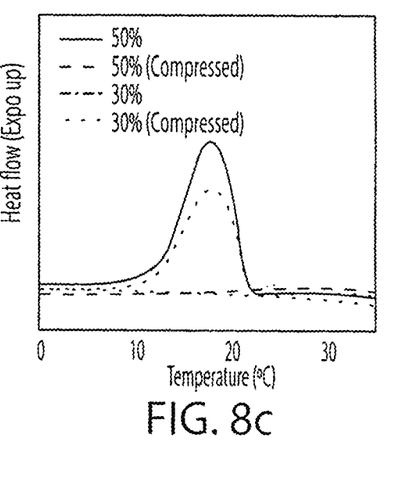
FIG. 8c shows cooling curve from differential scanning calorimetry (DSC) of pristine and compressed (33 MPa) ST3R composites.
Figure 9A:
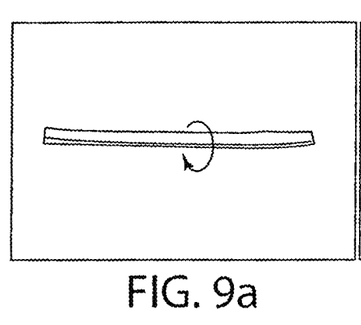
FIGS. 9a and 9b show twist deformation leading to swirled composite shape.
Figure 9B:
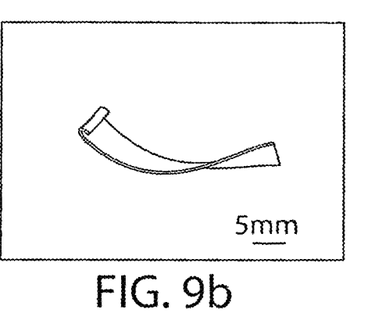

Complete solidification was observed even under low compression load irrespective of filler volume fraction (FIG. 8b-8c). This indicates that the continuous rise in Young's modulus (at low compressions) has a structural component in addition to the solidification of the metal, which could originate from changes in volume, shape or texture of the solidified metal and the formation of an interconnected network. Further evidence of total solidification is provided from scanning electron microscopy (SEM). Evaluating differences in particle shape by SEM before and after compression shows uniform spherical particles in the uncompressed ST3R sample while oblong/elongated particles are observed in the compressed ST3R samples. Solid FM composite, in contrast, showed negligible changes in particle appearance. Solidification of metallic alloys occurs with concomitant spinodal decomposition and hence changes in sub-surface composition. Analyzing contrast in the fillers with SEM using an energy selective backscattered (EsB) detector shows uniform contrast in the uncompressed ST3R sample. Upon compression of the ST3R sample, however, spinodal decomposition is observed on the metallic phase via Z-contrast of backscattered electrons. As observed in the compressed samples, permanent deformation due to modulus changes can be achieved by stressing the ST3R composite material. FIGS. 9a-9b illustrate that the shape of the ST3R composite is tunable or reconfigurable at room temperature, in this case by twisting a sample. The strip retains its shape even after the applied stress is removed (FIG. 9b).

The present invention thus envisions forming a polymer composite having a reversible shape that is first formed by applying an external stimulus to the polymer composite. The changed composite shape is reversibly retained after removal of the application of the stimulus by the phase transformation of the released metallic material. The changed shape is thermally reversible by heating the composite to melt at least some of the phase transformed metallic material.

Figure 9C:
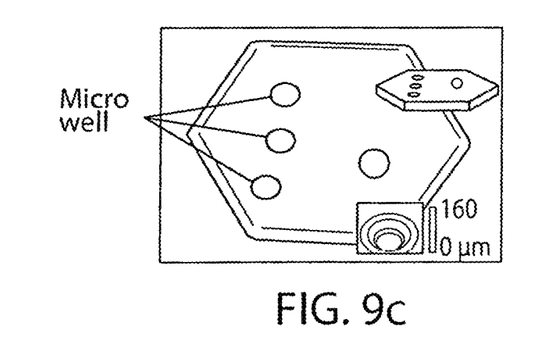
FIG. 9c shows recessed wells formed by selective compression of a composite sample.

Furthermore, controlled indentation of a flat ST3R composite with a blunt object can form micro wells of tunable depth (see profilometry of an example, insert FIG. 9c). A linear correlation between applied force and depth of the wells shows that the compressive deformation is highly tunable. The wells can hold a liquid, while the undeformed portion of the sample releases the liquid when tilted. The shape of the as-embossed wells is reversibly locked in place by the solidified metal alloy released from the ruptured undercooled LMCS particles by the indentation force. A combination of shaping by twisting/bending and compression as well as origami and/or kirigami techniques can also lead to fabrication of complex surface topology as illustrated with a slanting strip that can also hold water. Since the deformed shape is due to solidification, it can readily be reversed by an inverse phase transformation (melting). It has already been demonstrated above that a shaped (curved) compressed sample of the composite flattens upon heating above the $T_m$ of the filler material, e.g. see FIGS. 6c-6d. Upon the first solidification from the metastable released liquid metal core material to the solid metal core material in the matrix, the ST3R sample transitions into a metal-elastomer composite whereby its shape can be reconfigured or changed by melting the metal filler. Under such circumstances, the elastomer is locked in place when the released metal core material solidifies. During the melting process, the ST3R composite can be observed to relax and partially retain its original shape due to elastic response from the matrix.

Although the examples above describe various self-strengthening polymer composites, the present invention envisions a polymer composite that is self-healing in response to a stimulus that forms a crack(s) in the composite wherein self-healing is achieved as a result of the liquid metallic material released from at least some of the ruptured undercooled LMCS particles filling the crack(s) and solidifying there to heal the defect. This embodiment is useful for, although not limited to, a polymer composite wherein the polymer matrix is a non-elastomeric polymer.

Practice of the present invention provides a mechanically triggered stiffness tunable composite material by managing the interplay between thermodynamic relaxation and response of metastable liquid metal to mechanical (tensile or compressive) stress. Stiffness change can be selectively targeted resulting in the ability to couple material transformation with shape reconfiguration. Composites with such capabilities could find unique applications as mechanically adaptive or responsive (smart) materials where external sources of energy such as heat or electricity are not available. Significant changes in thermal and electrical transport properties are expected to simultaneously occur along with the reported increase in stiffness due to transformation of the undercooled LCMS filler particles into a different phase and shape with concomitant fusion to an at least partially fused network at higher loading. Furthermore, as the metastable undercooled LMCS particles do not rely on a specific material chemistry, self-stiffening behavior can be incorporated into diverse materials and applications ranging from sensors and functional devices to reconfigurable structures and robotics.

Although certain illustrative embodiments of the present invention are described, those skilled in the art will appreciate that the present invention is not limited to these embodiments and that changes and modification can be made to the invention without departing from the spirit and scope of the invention as set forth in the appended claims.

REFERENCES, WHICH ARE INCORPORATED HEREIN BY REFERENCE

[1] M. T. Byrne, Y. K. Gun'ko, Adv. Mater. 2010, 22, 1672.

[2] T.-L. Sun, G.-Y. Qing, Adv. Mater. 2011, 23, H57.

[3] J. Benson, I. Kovalenko, S. Boukhalfa, D. Lashmore, M. Sanghadasa, G. Yushin, Adv Mater 2013, 25, 6625.

[4] J. Jeon, H.-B.-R. Lee, Z. Bao, Adv. Mater. 2013, 25, 850.

[5] D. Ge, E. Lee, L. Yang, Y. Cho, M. Li, D. S. Gianola, S. Yang, Adv. Mater. 2015, 27, 2489.

[6] S. Yao, Y. Zhu, Adv. Mater. 2015, 27, 1480.

[7] J. Di, X. Zhang, Z. Yong, Y. Zhang, D. Li, R. Li, Q. Li, Adv. Mater. 2016, 28, 10529

[8] M. D. Bartlett, A. Fassler, N. Kazem, E. J. Markvicka, P. Mandal, C. Majidi, Adv. Mater. 2016, 28, 3726.

[9] S. H. Jeong, S. Chen, J. Huo, E. K. Gamstedt, J. Liu, S.-L. Zhang, Z.-B. Zhang, K. Hjort, Z. Wu, Sci. Rep. 2015, 5, 18257.

[10] F. Ilievski, A. D. Mazzeo, R. F. Shepherd, X. Chen, G. M. Whitesides, Angew. Chem., Int. Ed. 2011, 50, 1890.

[11] D. Rus, M. T. Tolley, Nature 2015, 521, 467.

[12] R. F. Shepherd, F. Ilievski, W. Choi, S. A. Morin, A. A. Stokes, A. D. Mazzeo, X. Chen, M. Wang, G. M. Whitesides, Proc. Natl. Acad. Sci. U.S.A. 2011, 108, 20400.

[13] M. Wang, H. Singh, T. A. Hatton, G. C. Rutledge, Polymer 2004, 45, 5505.

[14] K. C. Hribar, R. B. Metter, J. L. Ifkovits, T. Troxler, J. A. Burdick, Small 2009, 5, 1830.

[15] V. Q. Nguyen, A. S. Ahmed, R. V. Ramanujan, Adv. Mater. 2012, 24, 4041.

[16] I. M. Van Meerbeek, B. C. MacMurray, J. W. Kim, S. S. Robinson, P. X. Zou, M. N. Silberstein, R. F. Shepherd, Adv. Mater. 2016, 28, 2801.

[17] A. Tonazzini, S. Mintchev, B. Schubert, B. Mazzolai, J. Shintake, D. Floreano, Adv. Mater. 2016, 28, 10142.

[18] W. Wang, H. Rodrigue, S.-H. Ahn, Sci. Rep. 2016, 6, 20869.

[19] Q. Zhang, K. Zhang, G. Hu, Sci. Rep. 2016, 6, 22431.

[20] S. R. White, N. R. Sottos, P. H. Geubelle, J. S. Moore, M. R. Kessler, S. R. Sriram, E. N. Brown, S. Viswanathan, Nature 2001, 409, 794.

[21] I. D. Tevis, L. B. Newcomb, M. Thuo, Langmuir 2014, 30, 14308.

[22] S. Cinar, I. D. Tevis, J. Chen, M. Thuo, Sci. Rep. 2016, 6, 21864.

[23] L. Mullins, Rubber Chem. Technol. 1948, 21, 281.

[24] J. T. Bauman, *Fatigue, Stress, and Strain of Rubber Components: Guide for Design Engineers*, Carl Hanser Verlag GmbH Co KG, 2012.

[25] J. Diani, B. Fayolle, P. Gilormini, Eur. Polym. J. 2009, 45, 601.

[26] W. Hwang, K. S. Han, J. Compos. Mater. 1986, 20, 154.

We claim:

1. A composite material, comprising a polymer matrix and undercooled liquid metallic core-shell particles disposed in the matrix, said particles each having an outer shell and a liquid metallic material as a core contained within the outer shell, which is frangible such that the liquid metallic material is released from at least some of the particles in response to a stimulus applied to the composite and phase-changes in-situ in the polymer matrix.

2. The composite material of claim 1 wherein the released liquid metallic material is selected to solidify in-situ in the polymer matrix.

3. The composite material of claim 1 wherein at least some of the particles are fused together by inter-particle solidification of the released liquid metallic material after the stimulus is applied.

4. The composite material of claim 1 wherein the polymer comprises a single polymer or a copolymer.

5. The composite material of claim 1 wherein the outer shell comprises an oxide shell.

6. The composite material of claim 1 wherein the outer shell is functionalized with an organic moiety.

7. The composite of claim 1 which is self-healing in response to a stimulus that forms a crack in the composite wherein said self-healing is achieved as a result of said liquid metallic material filling said crack and solidifying there.

8. The composite of claim 1 which has a changed shape after application of the stimulus, which changed shape is retained by said phase transformation.

9. The composite of claim 8 wherein the changed shape is thermally reversible.

10. A self-strengthening composite material, comprising a polymer matrix and undercooled liquid metallic core-shell particles disposed in the matrix, said particles each having an outer shell and a liquid metallic material as a core contained within the outer shell, which is frangible such that the liquid metallic material is released from at least some of the particles in response to a stimulus applied to the composite and solidifies within the polymer matrix to increase the strength of the composite.

11. The composite material of claim 9 wherein the polymer comprises a single polymer or a copolymer.

12. The composite material of claim 9 wherein the outer shell comprises an oxide.

13. The composite material of claim 9 wherein the outer shell is functionalized with an organic moiety.

14. A reconfigurable composite material, comprising an elastomeric polymer matrix and undercooled liquid metallic core-shell particles disposed in the matrix, said particles each having an outer shell and a liquid metallic material as a core contained within the outer shell, which is frangible such that the liquid metallic material is released from at least some of the particles in response to a stimulus to the composite to change its shape and solidifies within the polymer matrix to retain the changed shape of the composite.

15. The composite material of claim 14 wherein the elastomeric polymer comprises a single or a copolymer.

16. The composite material of claim 14 wherein the outer shell comprises an oxide shell.

17. The composite material of claim 14 wherein the outer shell is functionalized with an organic moiety.

18. A method of making a polymer composite, comprising mixing undercooled liquid metallic core-shell particles and a polymer and curing the polymer to form the polymer composite.

19. The method of claim 18 wherein the polymer comprises a single polymer or a copolymer.

20. The method of claim 18 wherein the outer shell comprises an oxide shell.

21. The method of claim 18 wherein the outer shell is functionalized with an organic moiety.

22. A method of treating a polymer composite having a polymer matrix and undercooled liquid metallic core-shell particles disposed in the matrix by applying a stimulus that breaks the outer shell of the undercooled particles in a manner to release liquid metallic material from at least some of the particles and induce phase transformation of the released liquid metallic material in-situ in the polymer matrix.

23. The method of claim 22 wherein the composite is treated by applying an external stimulus to the composite comprising at least one of a tensile force, a compressive force, a shear force, vibrational force, a chemical etchant, a chemical flux, heat application, shock wave impingement, ultrasound impingement, and light impingement such as laser light and focused beam light impingement.

24. The method of claim 22 wherein applying of the stimulus effects a change of shape of the composite wherein the changed shape is retained after application of the stimulus by said phase transformation of the released metallic material.

25. The method of claim 24 including the further step of heating the composite to thermally reverse the changed shape.

* * * * *

UNITED STATES PATENT AND TRADEMARK OFFICE
CERTIFICATE OF CORRECTION

PATENT NO. : 10,759,127 B2
APPLICATION NO. : 15/932512
DATED : September 1, 2020
INVENTOR(S) : Thuo et al.

Page 1 of 1

It is certified that error appears in the above-identified patent and that said Letters Patent is hereby corrected as shown below:

On the Title Page

In Column 2, under "Other Publications", Line 31, delete ""Efect" and insert --"Effect-- therefor In the Specification In Column 1, Line 53, delete "cinar et al." and insert --Çinar et al.-- therefor In Column 3, Line 66, delete "139° C.," and insert --139° C.),-- therefor In Column 5, Line 6, delete "(FIG. 20" and insert --(FIG. 2f)-- therefor In Column 7, Line 1, delete "FIG." and insert --FIGS.-- therefor In Column 7, Line 9, delete "running" and insert --tuning-- therefor In Column 7, Line 64, delete "(Mane" and insert --(Mann®-- therefor In Column 9, Line 44, delete "(FIG. 70" and insert --(FIG. 7f)-- therefor In Column 10, Line 7, delete "(FIG." and insert --(FIGS.-- therefor In the Claims In Column 12, Line 55, in Claim 7, after "composite", insert --material--

In Column 12, Line 60, in Claim 8, after "composite", insert --material--

In Column 12, Line 63, in Claim 9, after "composite", insert --material--

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*